United States Patent
Karapatis et al.

(10) Patent No.: US 12,396,529 B2
(45) Date of Patent: Aug. 26, 2025

(54) EXTERNAL PART ELEMENT FOR TIMEPIECE OR PIECE OF JEWELLERY AND METHOD FOR MANUFACTURING SUCH AN EXTERNAL PART ELEMENT

(71) Applicant: Montres Breguet S.A., L'Abbaye (CH)

(72) Inventors: Polychronis Nakis Karapatis, Premier (CH); Lucien Germond, Giez (CH); Adrien Chappuis, L'Isle (CH)

(73) Assignee: Montres Breguet S.A., L'Abbaye (CH)

( * ) Notice: Subject to any disclaimer, the term of this patent is extended or adjusted under 35 U.S.C. 154(b) by 440 days.

(21) Appl. No.: 18/053,780

(22) Filed: Nov. 9, 2022

(65) Prior Publication Data

US 2023/0200504 A1    Jun. 29, 2023

(30) Foreign Application Priority Data

Dec. 28, 2021 (EP) .................................. 21217928
Oct. 13, 2022 (EP) .................................. 22201436

(51) Int. Cl.

| | |
|---|---|
| A44C 27/00 | (2006.01) |
| C08J 5/04 | (2006.01) |
| C08K 7/06 | (2006.01) |
| C08L 71/08 | (2006.01) |
| C22C 45/00 | (2023.01) |

(52) U.S. Cl.
CPC ............ *A44C 27/003* (2013.01); *C08J 5/042* (2013.01); *C08K 7/06* (2013.01); *C08L 71/08* (2013.01); *C22C 45/003* (2013.01); *C08J 2371/08* (2013.01); *C08L 2207/04* (2013.01)

(58) Field of Classification Search
CPC ...... A44C 27/003; A44C 27/005; C08J 8/043; C08J 5/042; C22C 45/003; G04B 47/04; G04B 45/0076; C08K 7/06; C08L 71/08
See application file for complete search history.

(56) References Cited

U.S. PATENT DOCUMENTS

| | | |
|---|---|---|
| 2011/0103199 A1 | 5/2011 | Winkler et al. |
| 2021/0088976 A1 | 3/2021 | Le Loarer |

FOREIGN PATENT DOCUMENTS

| | | |
|---|---|---|
| EP | 2 138 323 A1 | 12/2009 |
| EP | 3 795 341 A1 | 3/2021 |

OTHER PUBLICATIONS

European Search Report issued May 30, 2022 in European Application 21217928.7 filed on Dec. 28, 2021, 3 pages (with English Translation of Categories and cited documents).

*Primary Examiner* — Jessee R Roe
(74) *Attorney, Agent, or Firm* — Oblon, McClelland, Maier & Neustadt, L.L.P.

(57) ABSTRACT

An external part element or component for a timepiece or piece of jewellery made with a fibre-reinforced polymer matrix composite material, this external part element including on at least one of the faces thereof at least one cavity wherein an insert made of metallic glass is housed. A method for manufacturing such an external part element is also described.

15 Claims, 1 Drawing Sheet

EXTERNAL PART ELEMENT FOR TIMEPIECE OR PIECE OF JEWELLERY AND METHOD FOR MANUFACTURING SUCH AN EXTERNAL PART ELEMENT

CROSS-REFERENCE TO RELATED APPLICATION

This application claims priority to European Patent Application No. 21217928.7 filed on Dec. 28, 2021, and European Patent Application No. 22201436.7 filed Oct. 13, 2022, the entire disclosures of which are hereby incorporated herein by reference.

TECHNICAL FIELD OF THE INVENTION

The present invention relates to an external part element for a timepiece or piece of jewellery. The present invention also relates to a method for manufacturing such an external part element.

TECHNOLOGICAL BACKGROUND

Numerous methods for manufacturing external part elements for timepieces or pieces of jewellery such as a back, middle, bezel or bracelet links have already been proposed. Among these known manufacturing methods, mention can be made of methods for manufacturing such external part elements by means of composite materials obtained by dispersing fibres in a polymer matrix. Examples of these composite materials are for example given by the polymer matrixes wherein carbon fibres are dispersed, also known as Carbon Fibre Reinforced Polymers or CFRP.

In use, it has been observed that the external part elements for timepieces or pieces of jewellery produced by means of composite materials regularly suffered from two major defects: a mediocre mechanical resistance to external attacks and a low brightness. Indeed, the polymer matrixes wherein carbon fibres were dispersed proved to be relatively soft and easy to scratch. Consequently, creating decorations or reliefs by means of such composite materials has proved not to be a technically long-lasting solution. Moreover, the matt appearance of the external part elements obtained by means of carbon fibre reinforced polymer matrix type composite materials rendered the use of such elements for the external parts of a high-end watch difficult to contemplate.

To remedy these problems, substitution solutions have already been proposed. For the embodiment of the external part elements most exposed to external attacks such as bezels or crown type control organs or push-pieces, metallic or ceramic materials have been used. Other composite materials of the metallic matrix and fibre reinforcement type have also been used. More recently, it was also proposed to embody external part elements for timepieces or pieces of jewellery by means of composite materials commonly referred to as "cermet" which are composed of a ceramic reinforcement and a metallic matrix.

Even though, in terms of the mechanical resistance of the external part elements, progress may have been obtained thanks to the use of composite materials with a metallic matrix and fibre or ceramic reinforcement, the resulting external part elements still do not fully meet requirements in the field of watchmaking and jewellery in respect of the mechanical resistance of the decorations or reliefs thereof. Indeed, the technique usually used to produce decorations or reliefs on these external part elements consists of combining physical vapour deposition (PVD) and electroforming and only makes it possible to obtain very thin layers. Consequently, although such layers are metallic and therefore have a glossier appearance, the thickness thereof is so small that the mechanical resistance of these thin layers to friction and wear is mediocre.

A further technique for decorating for example a wristwatch bezel has for example been proposed in European patent application EP2315673A1. Summarised briefly, this technique consists of providing a bezel for example made of ceramic on the surface whereof recesses are arranged to receive time indexes for example. An annular flange made of amorphous metal is then deposited on the surface of the bezel. Then this amorphous metal flange is heated to a temperature greater than the vitreous transition temperature Tg thereof and pressed such that the amorphous metal enters the recesses. Subsequently, the amorphous metal is cooled and the excess material is removed.

This technique advantageously makes it possible to obtain external part elements for timepieces with solid decorations more resistant to mechanical stress and wear. This technique which requires the preparation of an amorphous metal flange, heating, pressing then cooling thereof, and finally removal of the excess amorphous metal on the surface of the external part element, is however time-consuming to implement and therefore costly.

SUMMARY OF THE INVENTION

The aim of the present invention is that of remedying the drawbacks mentioned above as well as others by providing external part elements for timepieces or pieces of jewellery made of a material which fully meets the applicable requirements in the field of watchmaking and jewellery, particularly in terms of mechanical resistance and aesthetics. The present invention also provides a method for manufacturing such external part elements.

To this end, the present invention relates to an external part element for a timepiece or piece of jewellery made by means of a fibre-reinforced polymer matrix composite material, this external part element comprising on at least one of the faces thereof at least one cavity wherein an insert made of metallic glass is housed.

According to a special embodiment of the invention, the polymer material used to form the matrix is thermoplastic or thermosetting.

According to a further special embodiment of the invention, the polymer material is chosen in the group formed by polyetheretherketone (PEEK), polytetrafluoroethylene (PTFE) and polyamide-imide (PAI).

According to a further special embodiment of the invention, the fibres which reinforce the polymer matrix are chosen in the group formed by glass fibres, carbon fibres and aramid fibres.

According to a further special embodiment of the invention, the metallic glass used to produce the insert is bulk metallic glass (BMG) type.

According to a further special embodiment of the invention, the metallic glass used to produce the insert contains zirconium or platinum.

According to a further special embodiment of the invention, the metallic glass used to produce the insert results, apart from the unavoidable impurities, from an alloy of zirconium, copper, titanium, nickel, aluminium and niobium.

According to a further special embodiment of the invention, the metallic glass used to produce the insert comprises, as a mass percentage, zirconium, copper, titanium, nickel, aluminium and niobium according to the following quantities:

$60 \leq Zr \leq 75$ $10 \leq Cu \leq 20$ $0 \leq Ti \leq 6$ $7 \leq Ni \leq 15$ $0 \leq Al \leq 8$ $0 \leq Nb \leq 6$ According to a further embodiment of the invention, the metallic glass used to produce the insert is the alloy Vit106a with the composition Zr70Cu13Ni9.9Al3.65Nb3.4 as a mass percentage, or Vit105 with the composition Zr65.7Cu15.6Ni11.7Al3.7Ti3.3 as a mass percentage.

According to a further special embodiment of the invention, the metallic glass used to produce the insert results, apart from the unavoidable impurities, from an alloy of platinum, copper, nickel and phosphorus.

According to a further special embodiment of the invention, the metallic glass used to produce the insert comprises, as a mass percentage, platinum, copper, nickel and phosphorus according to the following quantities:

$80 \leq Pt \leq 90$ $5 \leq Cu \leq 10$ $1 \leq Ni \leq 3$ $4 \leq P \leq 7$

According to a further special embodiment of the invention, the metallic glass used to produce the insert is, as a mass percentage, given by the composition Pt85Cu7Ni2.3P5.7.

According to a further special embodiment of the invention, the metallic glass used to produce the insert has a vitreous transition temperature less than or equal to 350° C.

According to a further special embodiment of the invention, the external part element for a timepiece or piece of jewellery is a back, a middle, a bezel, a bracelet link or a clasp.

The present invention also relates to a method for manufacturing an external part element for a timepiece or piece of jewellery comprising the steps of:
producing the external part element by means of a fibre-reinforced polymer matrix composite material;
machining at least one cavity in at least one of the faces of the external part element;
heating a metallic glass to the melting point thereof;
filling the at least one metallic glass cavity by injection to form an insert;
performing, if required, finishing operations.

According to a special embodiment of the invention, the cavity is produced by milling.

According to a further special embodiment of the invention, the finishing operations consist of removing the excess material, polishing and/or trimming the insert.

Thanks to these features, the present invention provides external part elements for timepieces or pieces of jewellery which are covered externally with one or more inserts such as time indexes, numerals, a logo or any other technical or decorative inscription. These inserts, produced by injecting a metallic glass, are in the form of solid blocks and therefore have an excellent mechanical resistance to friction and wear. They have furthermore an appearance which is in keeping with the applicable aesthetic requirements in the fields of watchmaking and jewellery. Indeed, given that these inserts are thick, it is possible to subject them to all types of finishing operations to give them a glossy metallic brilliance. Similarly, these inserts are produced in a single step of injecting a metallic glass, which makes it possible to save considerable time and money, and ensure excellent manufacturing precision of these inserts. For all practical purposes, it will be noted that, for the needs of the present description, "metallic glass" means the range of metal alloys which have the specificity of being capable of being solidified in the at least partially amorphous state, i.e. without regular atom arrangement. Therefore, metallic glasses are clearly distinguished from conventional metals which, for their part, crystallise according to organised structures such as, in particular, simple cubic, centred or centred faces or hexagonal as well as variants of these structures. These metallic glasses are generally obtained from ternary, quaternary or higher alloys in which the ability to solidify in the amorphous state results from combining elements which have in relation to each other a dimensional incompatibility such that, from a given cooling rate, the solidification kinetics are slow enough to make it possible to obtain a disorganised solid crystallographic structure. The behaviour of this family of materials enables a similar use to that of the polymer materials such as injection moulding or hot working. This family of materials particularly have the advantage of having an enhanced corrosion resistance, high hardness and elastic behaviour which limits internal mechanical losses.

BRIEF DESCRIPTION OF THE FIGURES

Further features and advantages of the present invention will emerge more clearly from the following detailed description of an embodiment of an external part element for a timepiece or piece of jewellery according to the invention, this example being given purely by way of illustration and not merely limitation, with reference to the appended drawing wherein.

DETAILED DESCRIPTION OF THE INVENTION

The present invention is based on the general inventive concept which consists of providing external part elements for a timepiece or piece of jewellery which have mechanical and aesthetic features meeting the requirements in the field of watchmaking. To this end, the present invention discloses producing such external part elements by means of a fibre-reinforced polymer matrix composite material, then arranging on the surface of such external part elements at least one cavity wherein a decorative or functional insert made of metallic glass will be housed. Thanks to the use of a fibre-reinforced polymer matrix composite material, the external part element according to the invention has mechanical wear resistance and aesthetic features which make it perfectly suitable for horological applications. Moreover, the inserts, produced by injecting a metallic glass, form solid blocks having a sufficient thickness to enable them to withstand external mechanical attacks. Furthermore, given that these inserts are thick, they easily withstand the finishing operations which will give them maximum brightness and brilliance. Finally, these inserts are produced in a single injection step, which makes it possible to save considerable time and ensure excellent manufacturing precision of these inserts.

Figure 1:
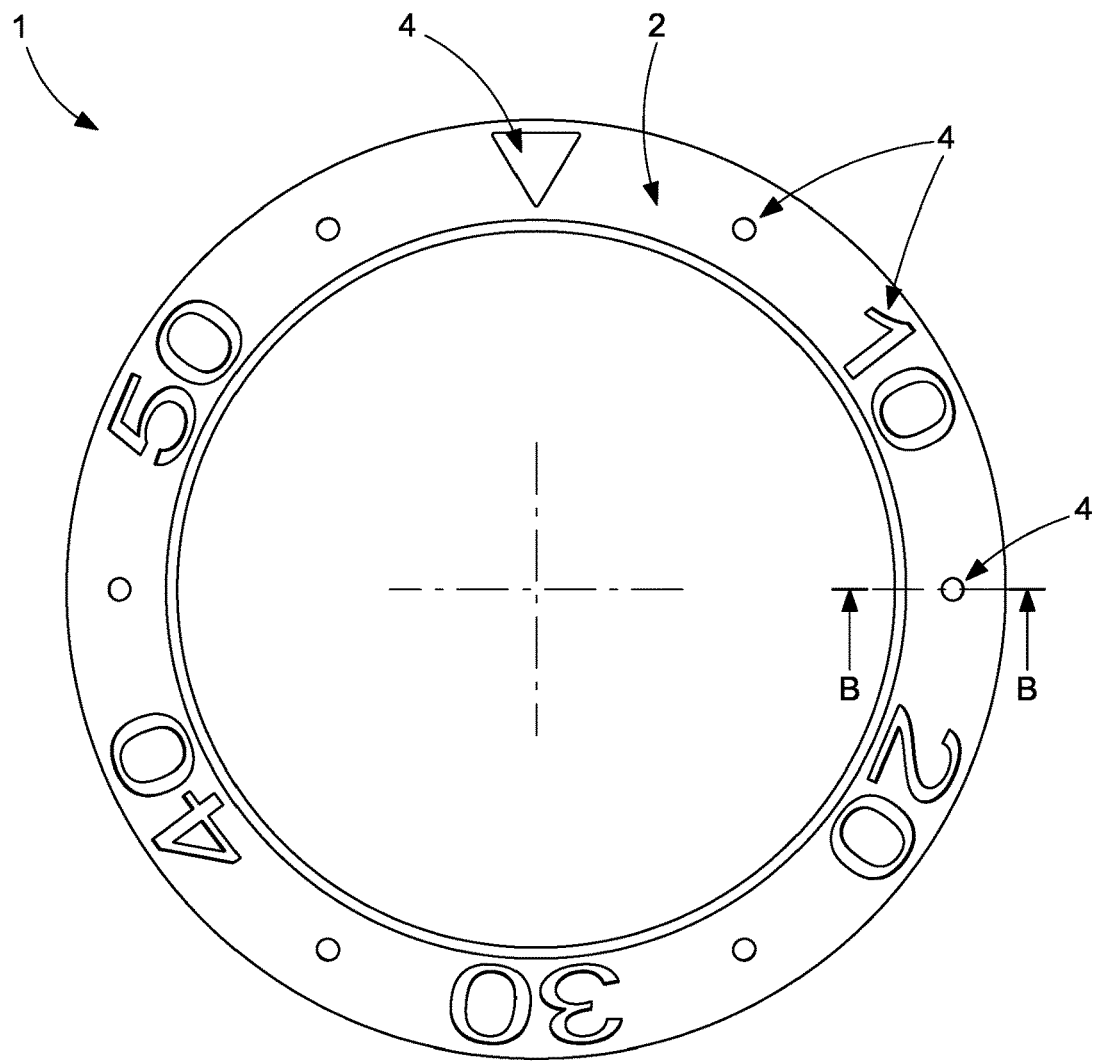
FIG. 1 is a top view of a watch bezel according to the invention.
Figure 2:
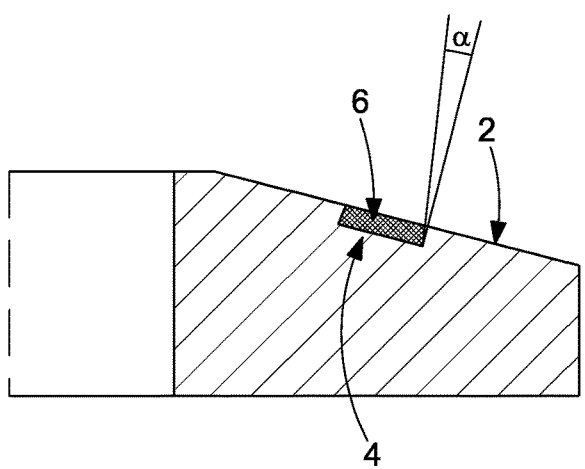
FIG. 2 is a sectional view along the line B-B in FIG. 1.

Designated as a whole by the general reference number 1, the bezel represented in FIG. 1 is an example of an external part element for a timepiece according to the invention. Further external part elements such as a back, middle, bracelet links and clasp can also be contemplated.

According to the invention, the bezel 1 is produced by means of a fibre-reinforced polymer matrix composite material. By way of illustrative and non-limiting example only, the polymer material used to form the matrix is thermoplastic or thermosetting. This polymer material is preferably chosen in the group formed by polyetheretherketone (PEEK), polytetrafluoroethylene (PTFE) and polyamide-imide (PAI). This matrix is reinforced by fibres which are preferably chosen in the group formed by glass fibres, carbon fibres and aramid fibres. A plurality of these bezels 1 can be individualized in a plate of composite material of required thickness.

For example, an external part element such as a bezel 1 according to the invention can be produced with a SPIDE TP type filament winding method developed by the French mechanical expertise centre CETIM. Explained very briefly, this filament winding method consists of winding fibres previously impregnated with a polymer material on a mould, for example such as a tube of cylindrical cross-section, in order to obtain a profile. At the same time as these pre-impregnated polymer fibres are wound around the mould according to a given number of layers and according to an angle with respect to the longitudinal axis of symmetry of the mould which is chosen particularly as a function of the subsequent use of the resulting parts which will be obtained by cutting the profile, they are heated to a sufficiently high temperature to cause the melting of the polymer with which they are impregnated and pressed against the mould. Finally, the resulting parts are machined conventionally by means of lathes and milling machines to bring them to their final dimensions.

In the case of the present invention, the bezels 1 are cut in a tubular profile in which the internal diameter is typically of the order of 30 mm and in which the external diameter is 45 mm. The tubular profile wherein the bezels 1 according to the invention are cut is obtained by winding carbon fibres in which the diameter is typically of the order of 5 to 25 μm and which are impregnated with polyetheretherketone (PEEK) in which the melting point is 341° C. To obtain the tubular profiles sought wherein the bezels 1 according to the invention will be subsequently cut, the carbon fibres are preferably wound according to an angle of 90° perpendicularly to the longitudinal axis of symmetry of the tubular profile.

The tubular profiles used to produce particularly the bezels 1 are typically composed of approximately 35% PEEK polymer and 65% carbon fibres within plus or minus 10%. It is therefore understood that the external part elements obtained from these tubular profiles contain a large proportion of carbon fibres, which substantially improves the thermal conductivity thereof and enables them to rapidly diffuse the heat input during the injection of the metallic glass. Consequently, although the temperature at which the metallic glass is injected is greater than the melting point of the polymer matrix, the bezels 1 are not decomposed, nor are they distorted. It will also be noted that the reduced thickness of the injected inserts combined with the good thermal conductivity of the mould and the composite material considerably reduce the exposure time of the polymer to a temperature higher than the melting point thereof. Consequently, it is not necessary to take specific additional measures to limit the degradation of the polymer during the brief contact with the metallic glass. The visible parts of the composite having potentially been in contact with the metallic glass will moreover be removed during surface finishing operations after removal from the mould.

The bezel 1 comprises on a top face 2 one or more cavities 4 typically produced by milling. According to the invention, these cavities 4 will be filled by means of a metallic glass type material to form inserts 6. Non-restrictively, as seen in FIG. 1, these inserts 6 indicate numerals and indexes for example of triangular or circular shape. Preferably, these cavities 4 have an undercut angle a between 5 and 10° to ensure superior mechanical strength of the inserts 6.

The metallic glass used to produce the inserts 6 is bulk metallic glass (BMG) type. Preferably, this metallic glass contains zirconium. It is possible for example to use an alloy containing, apart from the unavoidable impurities, zirconium, copper, titanium, nickel, aluminium and niobium. According to a non-limiting example, the metallic glass used to produce the insert comprises these materials as a mass percentage according to the following quantities:

$60 \leq Zr \leq 75$ $10 \leq Cu \leq 20$ $0 \leq Ti \leq 6$ $7 \leq Ni \leq 15$ $0 \leq Al \leq 8$ $0 \leq Nb \leq 6$ An example of a metallic glass containing zirconium which is suitable for the needs of the invention is the alloy Vit106a with the composition Zr70Cu13Ni9.9Al3.65Nb3.4 as a mass percentage, or Vit105 with the composition Zr65.7Cu15.6Ni11.7Al3.7Ti3.3 as a mass percentage.

The metallic glass used for producing the inserts 6 can also be based on platinum. It is possible for example to use an alloy containing, apart from the unavoidable impurities, platinum, copper, nickel, aluminium and phosphorus. According to a non-limiting example, the metallic glass used to produce the insert comprises these materials as a mass percentage according to the following quantities:

$80 \leq Pt \leq 90$ $5 \leq Cu \leq 10$ $1 \leq Ni \leq 3$ $4 \leq P \leq 7$

According to a further special embodiment of the invention, the metallic glass used to produce the insert is, as a mass percentage, given by the composition Pt85Cu7Ni2.3P5.7.

According to a further special embodiment of the invention, the metallic glass used to produce the insert has a vitreous transition temperature less than or equal to 350° C.

According to the invention, to form the inserts 6, the cavities 4 are filled with metallic glass by injection. For this purpose, a metallic glass ingot is provided, which is placed in a melting chamber and is heated to a temperature greater than the melting temperature thereof. Once the metallic glass ingot has melted, the metallic glass is injected into a mould wherein the bezel 1 is placed and which is arranged such that the metallic glass fills the cavities 4 of this bezel 1. The injection of the metallic glass into the mould wherein the bezel 1 is placed can be carried out by mechanical pressure supplied by a piston or by pressure from a gas. The cavities 4 are preferably filled with a slight extra thickness of metallic glass so as to provide an optimal link between the bezel 1 and the inserts 6.

After cooling the metallic glass, the bezel 1 is removed from its mould and can undergo finishing operations such as removing excess material, grinding and/or mechanical or chemical polishing. Any additional thicknesses and burrs are also removed by trimming.

It goes without saying that the present invention is not limited to the embodiment that has just been described, and that miscellaneous modifications and simple variants may be contemplated by the person skilled in the art without departing from the scope of the invention as defined by the appended claims. It will be understood in particular that, within the scope of the invention, it is necessary to momentarily heat the metallic glass to the melting point thereof so that it can be injected by means of an injection machine.

LIST OF REFERENCES

1. Bezel
2. Top face
4. Cavities
6. Inserts

The invention claimed is:

1. The external part element or component for a timepiece or piece of jewellery made with a fibre-reinforced polymer matrix composite material, said external part element comprising on at least one of the faces thereof at least one cavity wherein an insert made of metallic glass is housed.

2. The external part element or component according to claim 1, wherein the external part element for a timepiece or piece of jewellery is a back, a middle, a bezel, a bracelet link or a clasp.

3. The external part element or component according to claim 1, wherein the polymer material used to form the matrix is thermoplastic or thermosetting.

4. The external part element or component according to claim 3, wherein the fibres which reinforce the polymer matrix are chosen in the group formed by glass fibres, carbon fibres and aramid fibres.

5. The external part element or component according to claim 3, wherein the polymer material is chosen in the group formed by polyetheretherketone (PEEK), polytetrafluoroethylene (PTFE) and polyamide-imide (PAI).

6. The external part element or component according to claim 5, wherein the fibres which reinforce the polymer matrix are chosen in the group formed by glass fibres, carbon fibres and aramid fibres.

7. The external part element according to claim 6, wherein the composite material is composed of 35% PEEK polymer and 65% carbon fibres within plus or minus 10%.

8. The external part element or component according to claim 1, wherein the metallic glass used to produce the insert is bulk metallic glass.

9. The external part element or component according to claim 8, wherein the metallic glass used to produce the insert has a vitreous transition temperature less than or equal to 350° C.

10. The external part element or component according to claim 8, wherein the metallic glass used to produce the insert contains zirconium or platinum.

11. The external part element or component according to claim 10, wherein the metallic glass used to produce the insert comprises, as a mass percentage, platinum, copper, nickel and phosphorus according to the following quantities:

$80 \leq Pt \leq 90$ $5 \leq Cu \leq 10$ $1 \leq Ni \leq 3$ $4 \leq P \leq 7$.

12. The external part element or component according to claim 11, wherein the metallic glass used to produce the insert is, as a mass percentage, given by the composition Pt85Cu7Ni2.3P5.7.

13. The external part element or component according to claim 10, wherein the metallic glass used to produce the insert results, apart from the unavoidable impurities, from an alloy of zirconium, copper, nickel, aluminium and/or niobium and/or titanium.

14. The external part element or component according to claim 13, wherein the metallic glass used to produce the insert comprises, as a mass percentage, zirconium, copper, titanium, nickel, aluminum and niobium according to the following quantities:

$60 \leq Zr \leq 75$ $10 \leq Cu \leq 20$ $0 \leq Ti \leq 6$ $7 \leq Ni \leq 15$ $0 \leq Al \leq 8$ $0 \leq Nb \leq 6$.

15. The external part element or component according to claim 14, wherein the metallic glass used to produce the insert is an alloy with the composition Zr70Cu13Ni9.9A13.65 Nb3.4 as a mass percentage, or an alloy with the composition Zr65.7Cu15.6Ni11.7A13.7Ti3.3 as a mass percentage.

* * * * *